United States Patent
Siefken

(10) Patent No.: US 7,424,219 B2
(45) Date of Patent: Sep. 9, 2008

(54) VIEWFINDER SYSTEM FOR A DIGITAL CAMERA AND DIGITAL CAMERA PROVIDED WITH SUCH A SYSTEM

(75) Inventor: Harald Siefken, Kitchener (CA)

(73) Assignee: DALSA Corporation, Waterloo (CA)

( * ) Notice: Subject to any disclaimer, the term of this patent is extended or adjusted under 35 U.S.C. 154(b) by 268 days.

(21) Appl. No.: 11/244,051

(22) Filed: Oct. 6, 2005

(65) Prior Publication Data

US 2007/0081816 A1    Apr. 12, 2007

(51) Int. Cl.
G03B 13/10 (2006.01)
G03B 1/60 (2006.01)
H04N 5/238 (2006.01)

(52) U.S. Cl. .................. 396/380; 396/378; 352/171; 348/368

(58) Field of Classification Search ......... 359/643–647; 396/378–381, 384; 348/39, 333.03, 341, 348/368; 352/170–172
See application file for complete search history.

(56) References Cited

U.S. PATENT DOCUMENTS

| | | | | |
|---|---|---|---|---|
| 4,090,253 A * | 5/1978 | Salgo | ............... | 365/128 |
| 4,540,262 A * | 9/1985 | Nakai et al. | ............... | 396/147 |
| 4,682,870 A * | 7/1987 | Atkinson | ............... | 396/515 |
| 4,921,342 A * | 5/1990 | Pringle | ............... | 352/171 |
| 5,673,084 A * | 9/1997 | Lim et al. | ............... | 348/341 |
| 6,088,545 A * | 7/2000 | Abe et al. | ............... | 396/373 |
| 6,122,455 A * | 9/2000 | Hines | ............... | 396/385 |
| 6,538,699 B1 * | 3/2003 | Kosako | ............... | 348/341 |
| 6,749,304 B2 * | 6/2004 | Jacumet | ............... | 352/171 |
| 2003/0147049 A1 * | 8/2003 | Jacumet | ............... | 352/171 |
| 2003/0156835 A1 * | 8/2003 | Loo | ............... | 396/378 |

FOREIGN PATENT DOCUMENTS

| | | |
|---|---|---|
| JP | 4-324845 | 11/1992 |
| JP | 5-142645 | 6/1993 |
| JP | 6-289482 | 10/1994 |
| JP | 9-265120 | 10/1997 |
| JP | 11-174565 | 7/1999 |

* cited by examiner

Primary Examiner—W. B. Perkey
Assistant Examiner—Andrew Williams
(74) Attorney, Agent, or Firm—Fisher Technology Law PLLC

(57) ABSTRACT

A viewfinder system for a digital camera comprises a main optical path for projecting an outside scene image onto a light sensitive area facility, which facility determines a user field, and an optical extraction path for through mirror-operation extracting a fraction of the outside scene image onto a viewer optical path. The viewer optical path comprises a first mask for inserting a negative delineating outline into a viewer field and a second mask for inserting a positive delineating outline into the viewer field, both said first and second masks corresponding to the user field.

In particular, at least one of the first and second masks is realized by an electronic device that has its mask size variably controlled by an electronic facility on the basis of pixel-wise driving.

Advantageously, the electronic device is controlled by a sensor facility that is adapted for with respect to the other of the masks that has a fixed size sensing the latter size.

20 Claims, 2 Drawing Sheets

VIEWFINDER SYSTEM FOR A DIGITAL CAMERA AND DIGITAL CAMERA PROVIDED WITH SUCH A SYSTEM

BACKGROUND OF THE INVENTION

The invention relates to a viewfinder system for a digital camera that comprises a main optical path for projecting an outside scene image onto a light sensitive area facility, which facility determines a user field, and an optical extraction path for through mirror-operation extracting a fraction of said outside scene image onto a viewer optical path, and wherein said viewer optical path comprises a first mask for inserting a negative delineating outline into a viewer field and a second mask for inserting a positive delineating outline into the viewer field, both said first and second masks corresponding to said user field, such as being recited in the preamble of claim 1.

Digital cameras are abounding for amateur as well as for professional applications, for still pictures as well as for digital cinematographic applications. The organization of the light-sensitive area will determine the size of the image and/or the part of the outside scene that is available for a user application, such as in the form of a user field. Pixels outside the size of the user field will not be taken further into account. The viewer image is based on a fraction of the intensity of the relevant pixels. Just as the main optical path, the viewer field can have a particular size, that however can in principle be different from the size of the user field.

Now, the actual scene can count both elements that must appear in the user field, and also other elements that may not appear in the user field. Nevertheless, such other elements are often provided intentionally near the scene for realizing certain effects that may relate to the image itself (such as lighting apparatus or an air-fan to mimick winds and the like) or to other aspects of the scene such as audio (microphone dollies and the like). The camera user will want to see such elements in the viewer field without letting them intrude into the scene image proper as determined by the user field. Thus, for optimum discrimination, the representation of the user field is delimited by a mask that will often be just a framing line or even part of such framing line, such as by indicating only the corners of the frame.

Now, for optimum visibility, in lighter scenes the frame should be relatively darker, or negatively delineated, whereas in darker scenes the frame should preferably be relatively lighter, or positively delineated. The activation of the two frame versions could be simultaneously or alternately, such as by time division. Generally, the two masks are produced in or by respective separate facilities.

Now, in various situations, the frame size should allow adapting, such as being governed by a standard organization for transmission or storage, by a more or less arbitrary user choice, by a size and format (A, B, etcetera) of the paper on which the image would ultimately be printed or otherwise hard-copied, or by other considerations.

Prior art, in U.S. Pat. No. 6,088,545 to Abe et al., has proposed the use of hardware diaphragms for both positive and negative delimiting of the scene field. The present invention has recognized the great usefulness that is brought about by driving the size of at least one of the masks by an electronic facility on the basis of pixel-wise driving.

SUMMARY TO THE INVENTION

In consequence, amongst other things, it is an object of the present invention to introduce flexibility in the control of the mask size. Now therefore, according to one of its aspects, the invention is characterized in that at least one of said first and second masks is realized by an electronic device that has its mask size variably controlled by an electronic facility on the basis of pixel-wise driving, as recited in the second paragraph of claim 1. Both for fixed and also for variable mask size this offers an elementary realization. In case only one such mask is variably controlled, the other mask could have a fixed size, but could then be physically removable.

Advantageously, the electronic device is based on LCD technology. Low power consumption, a low price through LCD mass-production levels, and easy installing are some of the prominent advantages of LCD.

Advantageously, both of said first and second masks allow to view at least a part of said outside scene that is peripheral with respect to the mask in question, the mask proper being realized in the form of a thin line or the like. This will allow an operator to let necessary but unwanted objects approach as closely as possible the scene image fraction that is actually used. In contradistinction, the above reference U.S. Pat. No. 6,088,545, in its diaphragm elements 20A and 18 (FIG. 1) has only an outside restriction by a mechanical diaphragm, so that objects outside the mask will be readily obscured. Moreover, the prior art has only little flexibility. By itself, the present invention could have such diaphragms realized by pixel-wise driving.

Advantageously, the electronic device that has its mask size variably controlled is controlled by a sensor facility that is adapted for with respect to the other of said masks that has a fixed size sensing the latter size. Even in the case where one of the masks is based on a physically fixed size, the other's size will then be automatically adjusted. By way of example, the fixed-size mask could be exchangeable.

The invention also relates to a digital camera being provided with a viewfinder system as recited supra. Further advantageous aspects of the invention are recited in dependent Claims.

BRIEF DESCRIPTION OF THE DRAWING

These and further features, aspects and advantages of the invention will be discussed more in detail hereinafter with reference to the disclosure of preferred embodiments of the invention, and in particular with reference to the appended Figures that illustrate.

DETAILED DESCRIPTION OF PREFERRED EMBODIMENTS

Figure 1:
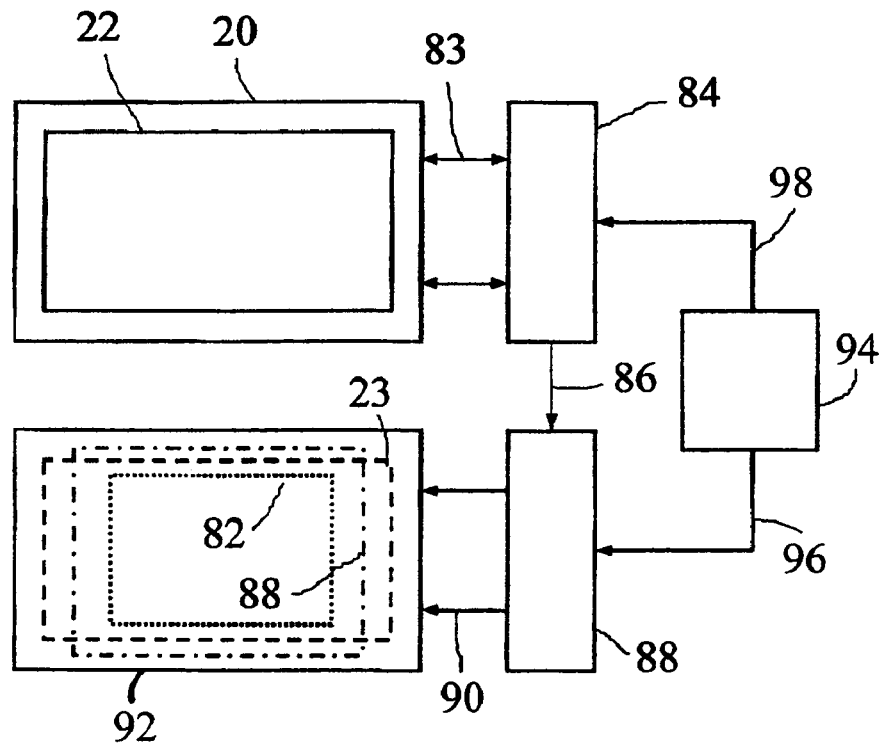
FIG. 1, an exemplary mask geometry and associated exemplary control facilities.

FIG. 1 illustrates an exemplary mask geometry, such but without limitation as may be used for generating a negative delineating outline. The outer dimensions of the image are shown by line 20. The field of view or area of interest AOI that will correspond to the user field is delineated by line 22. This line may be realized as a rectangular scratch applied to a glass plate. The extended field of view between lines 20, 22 is not used for the ultimate imaging, but can be viewed by the camera operator who may let unwanted objects such as microphones come as close as possible to the scene, but not closer. In the terminology of the art, this device in question is the "ground glass". In a particular embodiment, the ultimate CCD light sensitive area (maximum user field) is 34 mm wide and 17.2 mm high (4096×2048 pixels at a pixel size of 8.4 microns). Common reducing formats include 1.85:1, and 2.35:1. The unwanted image data will usually be deleted during post-processing. The frame format can then be stored in the image output file header, but the camera will still capture the full data content, without removal of information inside the camera. In many instances, the camera is manually set up to match the image requirements for the envisaged application. Calibration ensures that the area of interest depicted on the viewing monitor and the area of interest on the viewfinder are identical. If the identity of the ground glass is known beforehand, it can be used to change the frame format automatically, and if desired, even reduce the amount of data captured during recording.

The mask proper can be realized by a single file or by a multiple file of pixels, and if necessary, in an appropriate color. In LCD technology, it is straightforward to drive pixels in question for either transmitting or non-transmitting operation.

Figure 2:
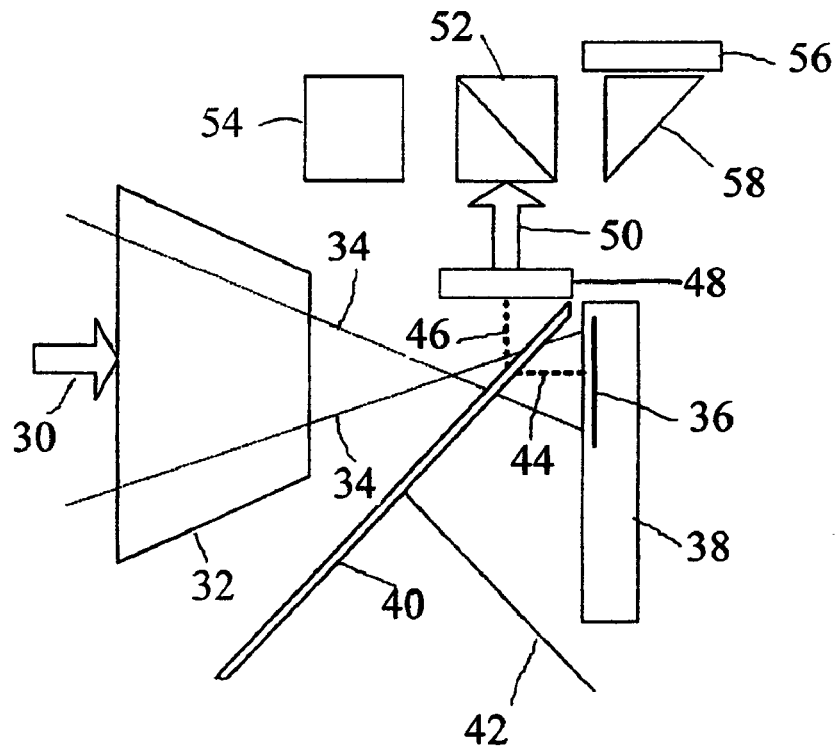
FIG. 2, an optical path geometry.

FIG. 2 illustrates an optical path geometry. At left, the arrow 30 symbolizes the light rays emanating from the object or outside scene. Block 32 symbolizes an optical lens system that may comprise all such optical elements deemed necessary for getting an image of appropriate quality on the CCD light sensitive area 36 that is located within subsystem 38 that accommodates all appropriate electrical and other elements. Just for discrimination, dotted lines 34 indicate the outer edge of the useful image cone or other geometry. The outputting of useful optical information from items 36, 38 to a user or user facility (storage, transmission, or other) has been omitted for brevity. This user field should effectively correspond to the mask effected by the ground glass; the degree of equality being governed by the quality level envisioned. For example, the mask effected by the ground glass could be just a little bit larger.

Now, shutter 40 with shutter drive mechanism 42 will allow to produce successive pictures or screens from the outer scene, which by itself is irrelevant to the invention. However, incidentally, the shutter allows a time wise split of the ray pattern 30 into rays 44 and 46, cf. the realization shown in FIG. 3. Rays 44 contribute to the scene image on element 36. On the other hand, rays 46 are reflected on shutter mirror plane 40 and constitute a secondary optical path. The so-called ground glass 48 will block rays organized in a delineating pattern such as item 22 in FIG. 1. The viewer path will thus allow easy discrimination between the inner part that is encompassed in the user image with respect to item 36, and an outer part that can be seen by the operator, but is otherwise blocked with respect to user output facility 36, 38. The ground glass can be realized in the form of a rectangular scratched line on a removable glass plate, so that different configurations of the useful image can be attained. Otherwise, the plate can be executed as an LCD that can be rendered un-transmitting on a pixel-by-pixel basis, so that in either case item 22 will appear as a dark line when effecting a relatively lighter image. The geometry of the non-transmitting pixels can be a single row or column. If necessary, other configurations, such as two or three rows and/or columns may be used.

Ground glass 48 will thus transmit rays 50 that are substantially parallel, onto prism 52 that consists of two parts interconnected at a semi-reflecting mirror plane at a slope that is within a range near 45°. In a particular embodiment, the actual slope was 42.5°. In consequence, rays 50 will in part be reflected to the left, where a further prism 54 is used for reflecting the rays 50 to a viewfinder arm that will place the viewer image in an appropriate angle and position with respect to a user, cf. FIG. 3.

On the other hand, the so-called glow mask 56 will present a pattern that corresponds to the pattern from ground glass 48, but which in contradistinction to item 48, appears lighted, so that a lighted perimeter figure to the useful scene image can be inserted. Prism 58 will result in a reflection over 90° or other appropriate angle, and semi-reflecting prism 52 will transmit the light from glow mask 56 straight on. The images from items 48 and 56 will therefore be substantially identical, while only the lighting intensities thereof are relatively inverse. In a darker scene will therefore the image from glow mask 56 appear relatively lighter. Is appropriate, the user person will select one of the two as active. Preferably, glow mask 56 is realized in the form of a rectangular configuration of LEDs. Also for glow mask 56, the lighted figure could be one or more than one pixel thick, if necessary with a thickness that can be controlled for realizing certain effects.

Figure 3:
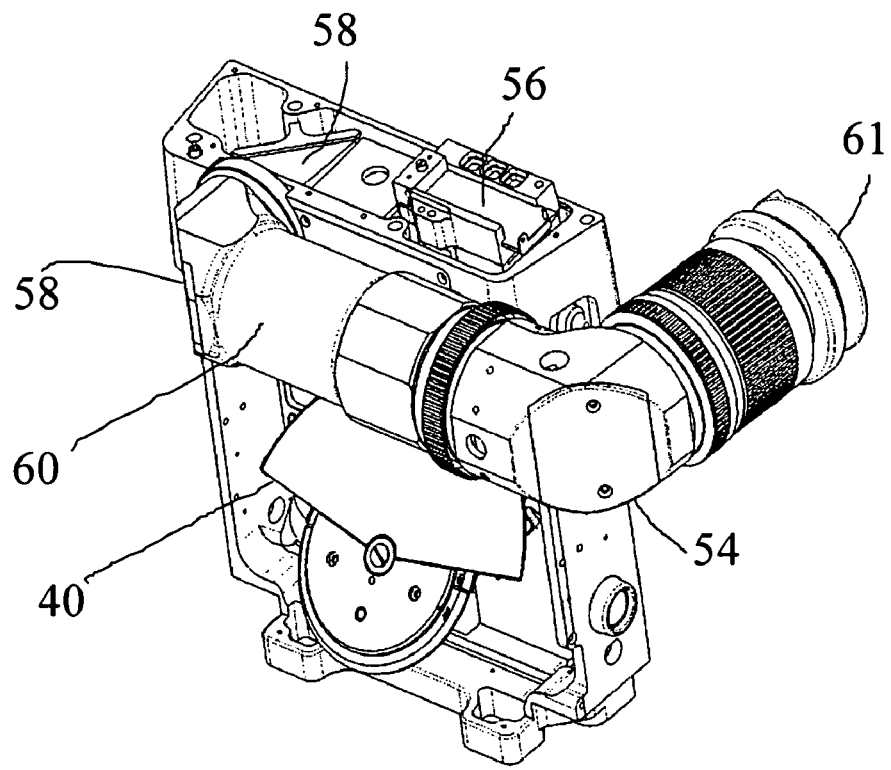
FIG. 3, an elementary camera geometry.

FIG. 3 illustrates an elementary camera geometry of a viewfinder system, wherein reference is had to the geometry discussed with regard to FIG. 2. Shutter 40 has been realized in the form of a rotating mirror. In non-reflecting orientations of the rotating mirror, the user image will be provided. In reflecting orientations, the viewer image will be provided. The viewfinder system encompasses an optical path that has various (more or less) right angles. The ground glass is not visible in this exploded view. Various numerals indicate parts discussed earlier with reference to FIG. 2, such as the housings of prisms or mirrors 54, 58 (that effectively has two reflecting planes, plus a further invisible one) and glow mask 56. Further elements are the optical path 60 of the viewfinder and the eyepiece 61.

Figure 4:
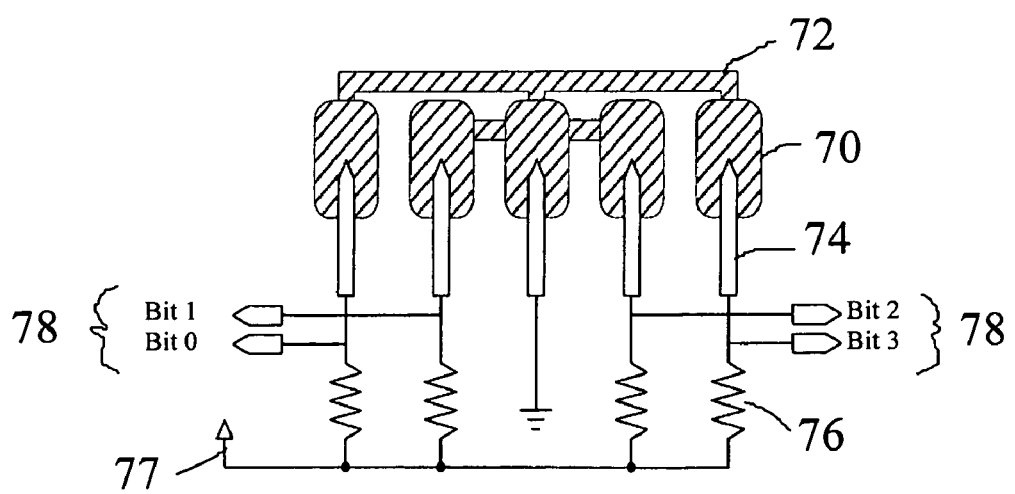
FIG. 4, a facility for producing an electronic code.

FIG. 4 illustrates a facility for producing an electronic code, in particular for use with the ground glass, and will be discussed with further reference to earlier FIG. 1. The code in this embodiment is digitally produced in hardware as based on pads 70 that have been selectively positioned on the ground glass plate 48: if a pad is present, such will signal a logical "1". If absent, such will signal a logical "0". Interconnect 72 allows to feed a first voltage level, in this case ground level as shown. Sensor pins 74 will connect to pads 70 if the ground glass is in position with respect to the viewfinder's housing. Resistors 76 will connect pins 74 to a second voltage level such as VCC at 77. Feelers will feed the voltage on the pads to a sensing arrangement not shown for brevity. In the arrangement shown, a four-bit code can be affected. Although not explicitly shown, in certain situations, an analog or mixed code would be feasible. Generally, but not restrictively, the glow mask would not have a passive code applied thereon, inasmuch as a flexible control thereof is preferred.

With regard to FIG. 1, here both the first (22) and second (23) masks are shown, that have corresponding sizes with regard to the ultimate display. As being preferably based on parallel light rays, generally also their physical sizes will correspond. Only with respect to the second mask, various possibilities for sizing the mask have been shown (23, 80, 82). Similar sizes would apply to the first mask, to keep it corresponding to the actual version of the second mask. Various control arrangements will now be discussed hereinafter.

a. First, with respect to the code generating in FIG. 4, the code on the ground glass 20 will be outputted on lines 83 as represented by the arrows to the right and detected by sensor arrangement 84. Next, in the form of a bit series through interconnect 86 they will feed glow mask controller 88. The latter will then through interconnect 90 drive the correct pattern in glow mask 92, so that patterns 22 and 23 will have corresponding sizes. A non-steady alternation in time between ground glass activation and glow mask activation is possible, but has not been shown for brevity.

b. In a second arrangement, a user person can activate interface facility 94. The latter can be as complicated as necessary, and can serve for inputting and signaling a variety of user data. A keyboard, local display, audio warning and various other items can be present according to needs. The control signalizations for the ground glass and the glow mask can run along lines 98 and 96, respectively, so that in this case both ground glass and glow mask will operate as slaves with respect to the user interface device 94. Interconnects 83 and 90 will then operate for driving, such as through the arrows pointing to the left. In that case, interconnect 86 need not be present. On the other hand, also in this case, ground glass and glow mask could operate with one being slave to the other. Then, interconnect 96 could be absent, with interconnect 86 controlling the slave. Alternatively, the ground glass can operate as slave.

Now, the present invention has here above been disclosed with reference to preferred embodiments thereof. Persons skilled in the art will recognize that numerous modifications and changes may be made thereto without exceeding the scope of the appended Claims. In consequence, the embodiments should be considered as being illustrative, and no restriction should be construed from those embodiments, other than as have been recited in the Claims.

The invention claimed is:

1. A viewfinder system for a digital camera that comprises a main optical path for projecting an outside scene image onto a light sensitive area facility, which facility determines a user field, and an optical extraction path for through mirror-operation extracting a fraction of said outside scene image onto a viewer optical path, wherein said viewer optical path comprises a first mask for inserting a negative delineating outline into a viewer field and a second mask for inserting a positive delineating outline into the viewer field, both said first and second masks corresponding to said user field, wherein at least one of said first and second masks is realized by an electronic device that has its mask size variably controlled by an electronic facility on the basis of pixel-wise driving, wherein the other of said first and second masks includes a surface upon which is attached a code facility operable to express a digital electronic code defined by a size of the other of said first and second masks, and wherein said electronic device is controlled by a sensor facility coupled to the code facility operable for sensing the digital electronic code.

2. A viewfinder system as claimed in claim 1, wherein both said first and second masks are realized by respective electronic devices that each have their respective mask size variably controlled by an electronic facility on the basis of pixel-wise driving.

3. A viewfinder system as claimed in claim 2, wherein said respective electronic devices are interconnected by a size signaling facility with respect to one of said devices.

4. A viewfinder system as claimed in claims 2, wherein each of said first and second masks is configured to allow a user to view at least a part of said outside scene that is peripheral with respect to the delineating outline of the mask, the delineating outline of the mask being realized in the form of a thin line.

5. A viewfinder system as claimed in claim 1, wherein each of said first and second masks is configured to allow a user to view at least a part of said outside scene that is peripheral with respect to the delineating outline of the mask, delineating outline of the mask being realized in the form of a thin line.

6. A viewfinder system as claimed in claim 1, wherein said electronic device is based on LCD or LED technology.

7. A digital camera being provided with a viewfinder system as claimed in claim 1.

8. A viewfinder system for a digital camera, the viewfinder system comprising:

a main optical path for projecting an outside scene image onto a light sensitive area facility, the light sensitive area facility defining a user field; and an optical extraction path that includes a viewer optical path, the optical extraction path being configured for extracting a fraction of said outside scene image onto the viewer optical path, wherein said viewer optical path comprises a first mask for inserting a negative delineating outline into a viewer field and a second mask for inserting a positive delineating outline into the viewer field, both said first and second masks corresponding to said user field, wherein at least one of said first and second masks is realized by an electronic device that has its mask size variably controlled by an electronic facility on the basis of pixel-wise driving, wherein the other of said first and second masks includes a surface upon which is attached a code facility operable to express a digital electronic code corresponding to a characteristic of the other of said first and second masks, and wherein said electronic device is controlled by a sensor facility operable for sensing the digital electronic code.

9. A viewfinder system as claimed in claim 8, wherein the other of said first and second masks is realized by another electronic device that has its mask size variably controlled by another electronic facility on the basis of pixel-wise driving.

10. A viewfinder system as claimed in claim 9, further comprising a size signaling facility coupled between said respective electronic devices.

11. A viewfinder system as claimed in claim 8, wherein each of said first and second masks is configured to allow a user to view at least a part of said outside scene that is peripheral with respect to the delineating outline of the mask, the delineating outline of the mask being realized in the form of a thin perimeter line.

12. A viewfinder system as claimed in claim 8, wherein said electronic device is based on LCD or LED technology.

13. A viewfinder system as claimed in claim 8, wherein:

the delineating outline of the other of said first and second masks has a fixed size; and the digital electronic code corresponds to a size of the delineating outline of the other of said first and second masks.

14. A digital camera being provided with a viewfinder system as claimed in claim 8.

15. A viewfinder system for a digital camera, the viewfinder system comprising:

a main optical path for projecting an outside scene image onto a light sensitive area facility, the light sensitive area facility defining a user field;

a viewer optical path; and a shutter operable to rotate and extract a time-wise fraction of said outside scene image and to direct said time-wise fraction onto the viewer optical path, wherein said viewer optical path comprises a first mask for inserting a negative delineating outline into a viewer field and a second mask for inserting a positive delineating outline into the viewer field, both said first and second masks corresponding to said user field, and wherein at least one of said first and second masks is realized by an electronic device that has its delineating outline variably controlled by an electronic facility on the basis of pixel-wise driving.

16. A viewfinder system as claimed in claim 15, wherein:

the other of said first and second masks includes a surface upon which is attached a code facility operable to express a digital electronic code corresponding to a characteristic of the other of said first and second masks; and said electronic device is controlled by a sensor facility operable for sensing the digital electronic code.

17. A viewfinder system as claimed in claim 15, wherein the other of said first and second masks is realized by another electronic device that has its mask size variably controlled by another electronic facility on the basis of pixel-wise driving.

18. A viewfinder system as claimed in claim 17, further comprising a size signaling facility coupled between said respective electronic devices.

19. A viewfinder system as claimed in claim 15, wherein each of said first and second masks is configured to allow a user to view at least a part of said outside scene that is peripheral with respect to the delineating outline of the mask, the delineating outline of the mask being realized in the form of a thin perimeter line.

20. A viewfinder system as claimed in claim 15, wherein:

the delineating outline of the other of said first and second masks has a fixed size; and the digital electronic code corresponds to a size of the delineating outline of the other of said first and second masks.

* * * * *